United States Patent [19]

Sood

[11] Patent Number: 5,235,504
[45] Date of Patent: Aug. 10, 1993

[54] HIGH POWER-FACTOR CONVERTER FOR MOTOR DRIVES AND POWER SUPPLIES

[75] Inventor: Pradeep K. Sood, St. Louis, Mo.

[73] Assignee: Emerson Electric Co., St. Louis, Mo.

[21] Appl. No.: 670,031

[22] Filed: Mar. 15, 1991

[51] Int. Cl.⁵ .................... H02M 7/06; H02M 3/157; G05F 1/70
[52] U.S. Cl. .................... 363/53; 323/224; 363/81; 363/89
[58] Field of Search .................. 363/79, 80, 81, 89; 323/222, 224, 266

[56] References Cited

U.S. PATENT DOCUMENTS

| | | | |
|---|---|---|---|
| 4,618,812 | 10/1986 | Kawakami | 323/224 |
| 4,729,088 | 3/1988 | Wong | 363/124 |
| 4,958,121 | 9/1990 | Cuomo et al. | 323/224 |
| 4,964,029 | 10/1990 | Severinsky et al. | 363/80 |
| 5,134,355 | 7/1992 | Hastings | 323/222 |

FOREIGN PATENT DOCUMENTS

| | | | |
|---|---|---|---|
| 3104965 | 8/1982 | Fed. Rep. of Germany . | |
| 2497421 | 12/1980 | France | 323/222 |
| 53178 | 3/1987 | Japan . | |
| 252167 | 10/1989 | Japan . | |
| 261059 | 10/1990 | Japan . | |
| 307365 | 12/1990 | Japan . | |

OTHER PUBLICATIONS

*Unitrode Switching Regulator Power Supply Design Seminar Manual*, Unitrode Corp 1988, pp. 613, 614.

Primary Examiner—William H. Beha, Jr.
Attorney, Agent, or Firm—Polster, Lieder, Woodruff & Lucchesi

[57] ABSTRACT

A high power-factor converter (50) for use with motor drives and power supplies. A first and "buck"-type converter section (62) is connected to an a.c. voltage source. This section provides an output voltage having preselected voltage characteristics. This section is operational during that portion of an input voltage cycle in which the input voltage level exceeds that of the output voltage level. A second and "boost"-type converter section (70) is also connected to the voltage source. This second section also provides the output voltage, and is operational during that portion of the input voltage cycle in which the output voltage level exceeds that of the input voltage level. A control circuit (66) is responsive to the relative levels of the input and output voltages to operate the first and second converter sections on a time sharing basis in which converter operation is switched between the two converter sections as a function of the sensed actual output voltage characteristics compared to the preselected characteristics. This permits the converter to maintain a nearly full conduction angle, and therefore a high power factor, for any level of output voltage in a range from zero volts to voltage levels higher than the peak input voltage level.

7 Claims, 5 Drawing Sheets

HIGH POWER-FACTOR CONVERTER FOR MOTOR DRIVES AND POWER SUPPLIES

BACKGROUND OF THE INVENTION

This invention relates to power converters and, more particularly, to a high power-factor a.c. to d.c. power converter for use with motor drives and power supplies, the power-factor being defined as the ratio of the true power to the product of the voltage and current in a circuit, and a high power-factor being one which approximates or exceeds 0.9, with the maximum power-factor being 1.0.

A boost-type power converter is a well-known and practical choice for a high power-factor converter used in motor drive and power supply applications. This converter circuit has many advantages. One of these is realization of the line current waveform needed to comply with line harmonic standards, both present and anticipated. Another advantage is that it can provide a nearly full conduction angle. However, a boost converter requires the output voltage to always be higher than the peak input voltage. If a lower voltage is needed as, for example, in motor drives operating at lower speeds; then, the voltage reduction function must be performed separately which means additional converter cost and complexity. Boost-type converters must also have power-on input current surge limiting circuits, and output short-circuit current limiting circuits.

Buck-type power converters are also generally well-known in the art, and are frequently used in d.c. to d.c. converters. They can also used as a.c. to d.c. power converters. For example, buck-type a.c. to d.c. converters have been used in motor drives for household appliances as shown in co-pending U.S. Pat. application Ser. No. 339,502 which is assigned to the same assignee as the present application. A major limitation of buck-type converters is that the duration for which power can be extracted from a single-phase line supply (input conduction angle) decreases when the converter output voltage increases. This occurs, for example, in the spin mode of the washer drive. A consequence of this limitation is the cost of the power converter increases while the benefits derived from using it decrease, especially when a wide range of output voltages (motor speeds) is required.

At power levels below 200 Watts, a third type of converter, well-known as a flyback or buck-boost type of converter, is frequently used. An advantage of this converter is the realization of both a high conduction angle and output voltage control. However, this converter is not cost effective for higher power levels because it imposes excessive levels of peak currents and voltages on its power device. Further, flyback converters produce an output voltage of inverted polarity and require substantial filtering at both its input and output.

As a result of the foregoing, there is a need for a cost-effective and efficient a.c. to d.c. converter which can provide a full conduction angle, and thus a high power-factor, at any level of output voltage. Further, the converter must operate over a wide power range extending from a few tens of watts to several thousand watts.

SUMMARY OF THE INVENTION

Among the several objects of the present invention may be noted the provision of an efficient, reliable, and cost-effective high power-factor converter and an associated control circuit together capable of both a high conduction angle and full control of the output voltage; the provision of such a converter which is suitable for motor drives and power supply applications; the provision of such a converter which generates a nearly full conduction angle (high power-factor) for any level of the output voltage; the provision of such a converter control circuit which permits continuous control of the output voltage using a unique time sharing strategy; the provision of such a converter which alternatively permits optimization of the output voltage to a level compatible with system component ratings if continuous control is not desired; the provision of such a converter which is suitable for motor drives and power supply applications ranging into several thousand Watts; the provision of such a converter which requires only one major energy storage element for dc outputs and none for multi-phase ac outputs; the provision of such a converter requiring only high frequency filtering; the provision of such a converter which eliminates the power-on, in-rush current associated with boost type converters; the provision of such a converter in which functions can be readily combined to reduce the number of components required; and, the provision of such a converter having a control circuit which can, without modification, work with standard buck or boost converters.

In accordance with the invention, generally stated, a high power-factor converter is for use with motor drives and power supplies. A first and "buck"-type converter section is connected to an a.c. voltage source. This section provides an output voltage having preselected voltage characteristics, and is operational during a portion of the input voltage cycle in which the input voltage level exceeds that of the output voltage level. A second and "boost"-type converter section is also connected to the voltage source. This second section also provides the output voltage, and is operational during a portion of the input voltage cycle in which the output voltage level exceeds that of the input voltage level. A control circuit is responsive to the relative levels of the input and output voltages to operate the first and second converter sections on a time sharing basis in which converter operation is switched between the two converter sections as a function of the sensed actual voltage characteristics compared to the preselected characteristics. This permits the converter to maintain a nearly full conduction angle, and therefore a high power-factor, for any level of output voltage in a range from zero volts to voltage levels higher than the peak input voltage level. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF PREFERRED EMBODIMENTS

Figure 1:
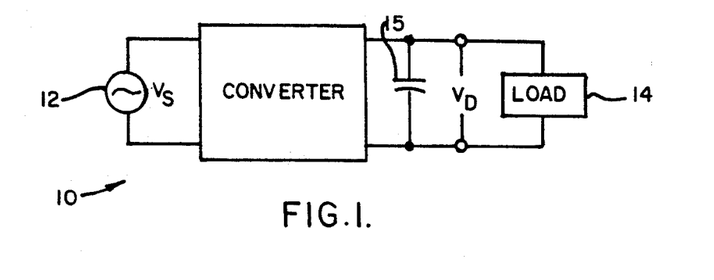
FIG. 1 is a schematic illustrating the basic functions of an AC-DC converter.

Referring to the drawings, a converter 10 is shown in FIG. for converting voltage $V_S$ from an a.c. voltage source 12 to a voltage $V_D$ which is supplied to a load 14. The converter employs an energy storage capacitor 15 to make up the difference between the instantaneous energy flow between the load and the voltage source. As described hereinafter, the load may be a power supply, an electric motor, a resistance, etc. The voltage $V_D$ may be a d.c. voltage, or the input of an inverter (not shown) that supplies an a.c. voltage, for example, to an a.c. motor M.

A major consideration in converter design is that it provide a high power-factor. Power-factor (PF) is defined as the ratio of true power P: to apparent power $P_A$. That is, $$FP = T_T/P_A,$$

where apparent power is equal to the product of rms voltage and rms current; i.e., $P_A = V_{rms} * I_{rms}$. $P-F_{max} = 1.0$, or unity. To obtain a unity power-factor requires that the conduction angle be 180 degrees (full conduction) and the current waveshapes within the circuit be the same as the input voltage waveshape. Thus, full conduction is a prerequisite to a high power factor. With respect to prior art converters, converters of a basic design typically employ various types of diode bridge and SCR bridge circuits. One reason for this is because such circuits are inexpensive. However, these circuits draw power from the voltage input line to which the converter is connected for only a very short interval of each voltage cycle. The result is both a low power-factor and a high crest factor of input current; i.e., $I_{peak}/I_{rms}$.

Figure 2A:
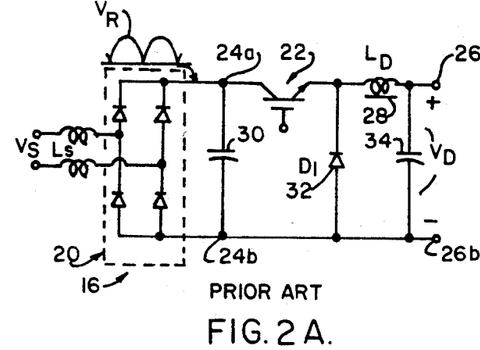
FIG. 2a is a schematic of a prior art buck-type AC-DC power converter.
Figure 3A:
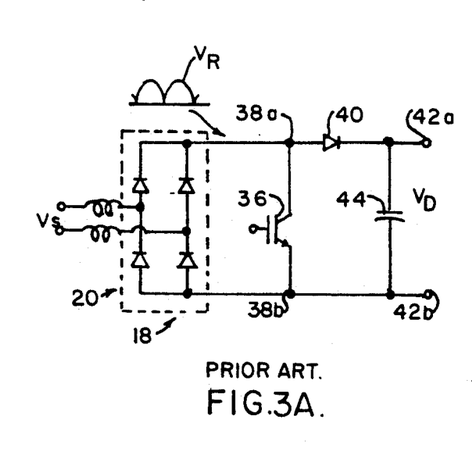
FIG. 3a is a schematic of a prior art boost-type AC-DC power converter.

The next level of sophistication in converter circuitry is the use of "buck" circuits 16 (see FIG. 2a), and "boost" circuits 18 (see FIG. 3a). Each circuit has a full-wave rectifier section 20 at its interface with the input voltage source. With respect to circuit 16, an insulated gate bipolar transistor (IGBT) 22 has its drain-source circuit series connected between output 24a of the rectifier section and one terminal 26a of the converter output. As is well-known in the art, other types of controlled power devices such as MOSFETs, bipolar devices, MCTs, etc., may be used in place of transistor 22. An inductor 28 is in-line connected between the transistor's source and the terminal. The other output 24b of the rectifier section is connected to the other output terminal 26b of the converter. A filter capacitor 30 is connected in parallel across outputs 24a, 24b, a diode 32 is connected in parallel between the source of transistor 22 and output 24b, and a storage capacitor 34 is connected in parallel across the output terminals. The converter output voltage $V_D$ is shown developed across capacitor 34.

Figure 2B:
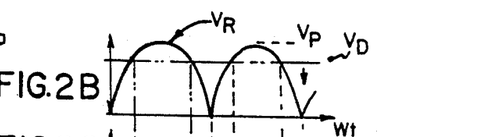
FIGS. 2b–2d are representations of various operating characteristics of the converter.
Figure 2C:
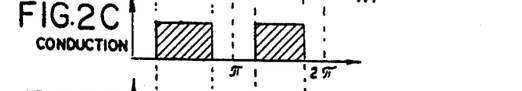
Figure 2D:
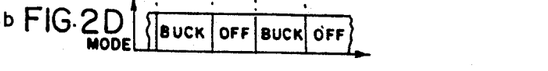

Referring to FIGS. 2b-2d, the operational characteristics of buck converter 16 are shown. Output voltage $V_D$ is shown in FIG. 2b as a constant amplitude level d.c. voltage, while the rectified output voltage $V_R$ from section 20 is cyclical, having a peak amplitude level $V_P$ exceeding the constant amplitude level of output voltage $V_D$. As seen in FIG. 2c, transistor 22 is in conduction only during that portion of each voltage cycle in which the amplitude of $V_R$ exceeds that of $V_D$. The resultant period of conduction is only a fraction of each input voltage cycle. Furthermore, the conduction angle changes with the level of $V_D$, rapidly decreasing as $V_D$ approaches the peak voltage $V_P$. Thus, a "buck" type converter 16 cannot have a high power-factor (i.e., PF 0.9) unless $V_D$ is restricted to low values relative to $V_P$.

Figure 3B:
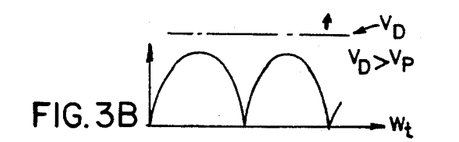
FIGS. 3b–3d are representations of various operating characteristics of the converter.
Figure 3C:
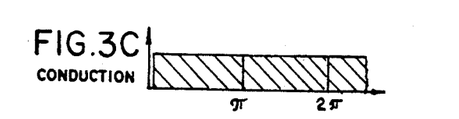
Figure 3D:
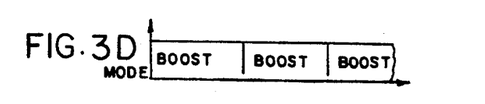

With respect to the boost converter of FIG. 3a, the drain-source circuit of an IGBT 36 is connected across the outputs 38a, 38b of rectifier section 20. A diode 40 is connected in series between output 38a and converter output terminal 42a, while output 38b is connected to output terminal 42b. An energy storage capacitor 44 is connected across the output terminals, and the converter output voltage $V_D$ is developed across this capacitor. As seen in FIG. 3b, the constant amplitude level of the converter output voltage exceeds the peak level $V_P$ of the rectifier section output throughout the voltage cycle. Consequently, transistor 36 is conducting for almost the entire cycle. While converter 18 produces a full conduction angle and thus a very high power-factor, the output voltage can no longer be controlled in the low voltage range relative to $V_P$. Since $V_D$ needs to be so controlled in motor drive and power supply applications, an additional means of voltage reduction thus becomes necessary, adding to the cost and complexity of the converter. Also, this type of converter requires additional components to limit the output short-circuit current. In addition, there is an initial power surge into capacitor 44 whenever power is applied to the circuit. This surge is ultimately detrimental to the operating life of the converter.

Figure 4A:
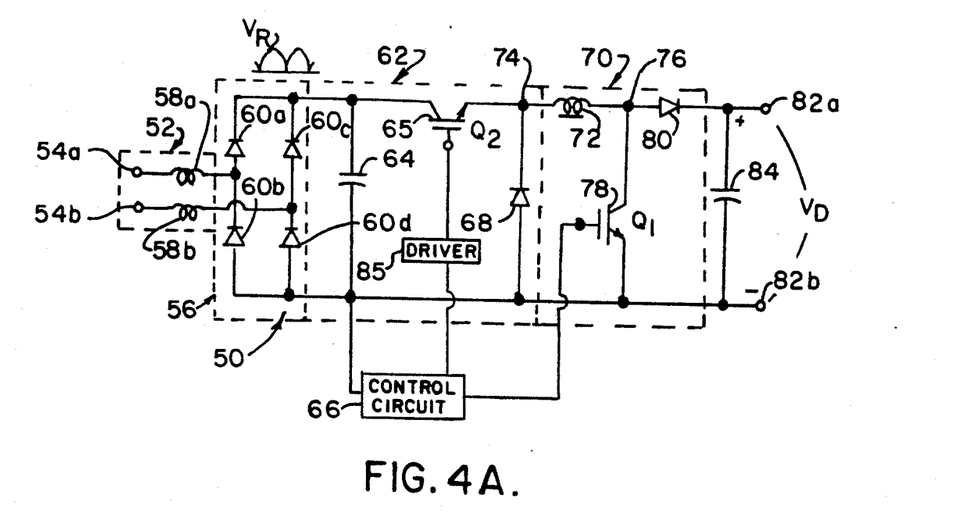
FIG. 4a is a schematic of a first embodiment of a converter circuit the present invention.

Referring to FIG. 4a, a high power-factor converter of the present invention is indicated generally 50. Converter 50 is for use with, for example, appliance motor drives and power supplies to convert an a.c. input voltage $V_S$ to a d.c. output voltage $V_D$. The converter has an input section 52 comprising a pair of terminals 54a, 54b which respectively connect to an a.c. voltage line. The a.c. voltage input to converter 50 is routed to a rectifier section 56. Respective inductors 58a, 58b are series connected in the lines from the input terminals to the rectifier section The rectifier is a full-wave rectifier comprising diodes 60a-60d connected in the manner well-known in the art. The output of the rectifier section is a full-wave rectified sinusoidal voltage $V_R$.

Converter 50 next includes a first conversion means 62. This first conversion means 62 performs its voltage conversion during a portion of the input voltage cycle in which the input voltage level exceeds that of the output voltage level. As seen in FIG. 4a, means 62 includes a filter capacitor 64 connected in parallel with the output of rectifier section 56. An IGBT 65 (transistor Q2) has its drain-source circuit connected in the high-voltage output path from the rectifier section. The gate of the transistor is connected to a control circuit 66 which will be described in more detail hereinafter. A diode 68 is connected in parallel between the source of transistor 65 and capacitor 64.

The converter further includes a second conversion means 70. This second conversion means performs its voltage conversion during a portion of the input voltage cycle in which the output voltage level exceeds that of the input voltage level. Means 70 includes an inductor 72 connected between a node 74 (to which the source of transistor 65 and the anode of diode 68 are also attached) and a node 76. The drain of an IGBT 78 (transistor Q1) is also connected to node 76. A diode 80 is connected between node 76 and an output terminal 82a of the converter. The source of transistor 78 is connected both to the cathode of diode 68 as well as to the other converter output terminal 82b. The gate of transistor 78 is connected to control circuit 66. An energy storage output capacitor 84 is connected across the output terminals and the converter output voltage $V_D$ is developed across this capacitor. It will again be understood that with respect to transistors 65 and 78, that besides being IGBTs, they can also be implemented using MOSFETs, MCTs, bipolar transistors, and other, similar types of semiconductor devices. Further, these devices can be used singly, or in serial and parallel combinations, all as is well-known in the art.

Figure 4B:
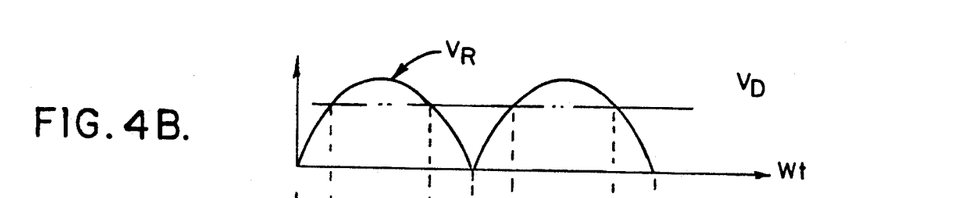
FIGS. 4b–4f are representations of various operating characteristics of the converter.
Figure 4C:
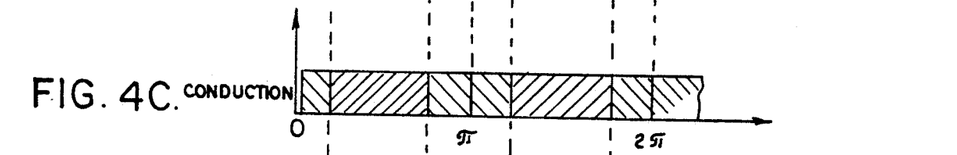
Figure 4D:
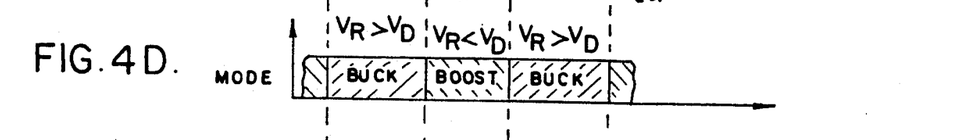

With respect to FIGS. 4b–4d, it is a feature of converter 50 that for an output voltage $V_D$ as shown, the converter operates in a step-down or "buck" mode for that portion of the line cycle in which the input voltage is higher than the output voltage. For the portion of the cycle when the input voltage is lower than the output voltage the converter operates in the step-up or "boost" mode. This is done to realize a nearly full conduction angle for any level of output voltage in a range from zero to voltage levels higher than the peak of input voltage. It is important to understand that this is accomplished not by a series connection of a buck-type and a boost-type converter; but rather by time-sharing the converter operation between the two conversion means as a function of sensed voltage characteristics compared with a preselected set of characteristics. Using this unique operational concept, converter 50 combines the most desirable features of bottom buck-type and boost-type converters without excessive stress on its power devices or an inversion of voltage polarity. It will be noted that while similar benefits might be obtainable, for example, by sequentially connecting a conventional boost and a conventional buck converter, such an arrangement would require intermediate energy storage capability in the form of an additional large capacitor. This would add to the overall cost of such a converter. The resulting sequential connection would, in effect, process the power twice resulting in greater losses in the system. These losses would not only reduce the overall efficiency of the power conversion, but decrease its cost-effectiveness because of a larger heat sink needed to dissipate the additional losses.

Figure 4E:
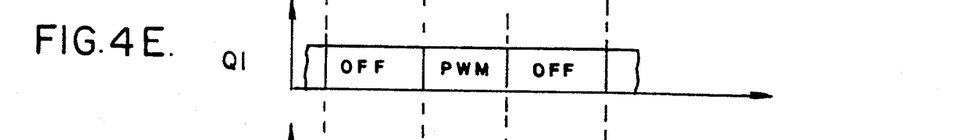
Figure 4F:
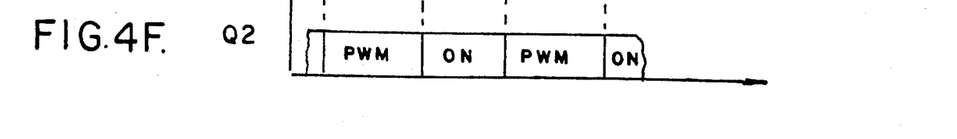
Figure 7:
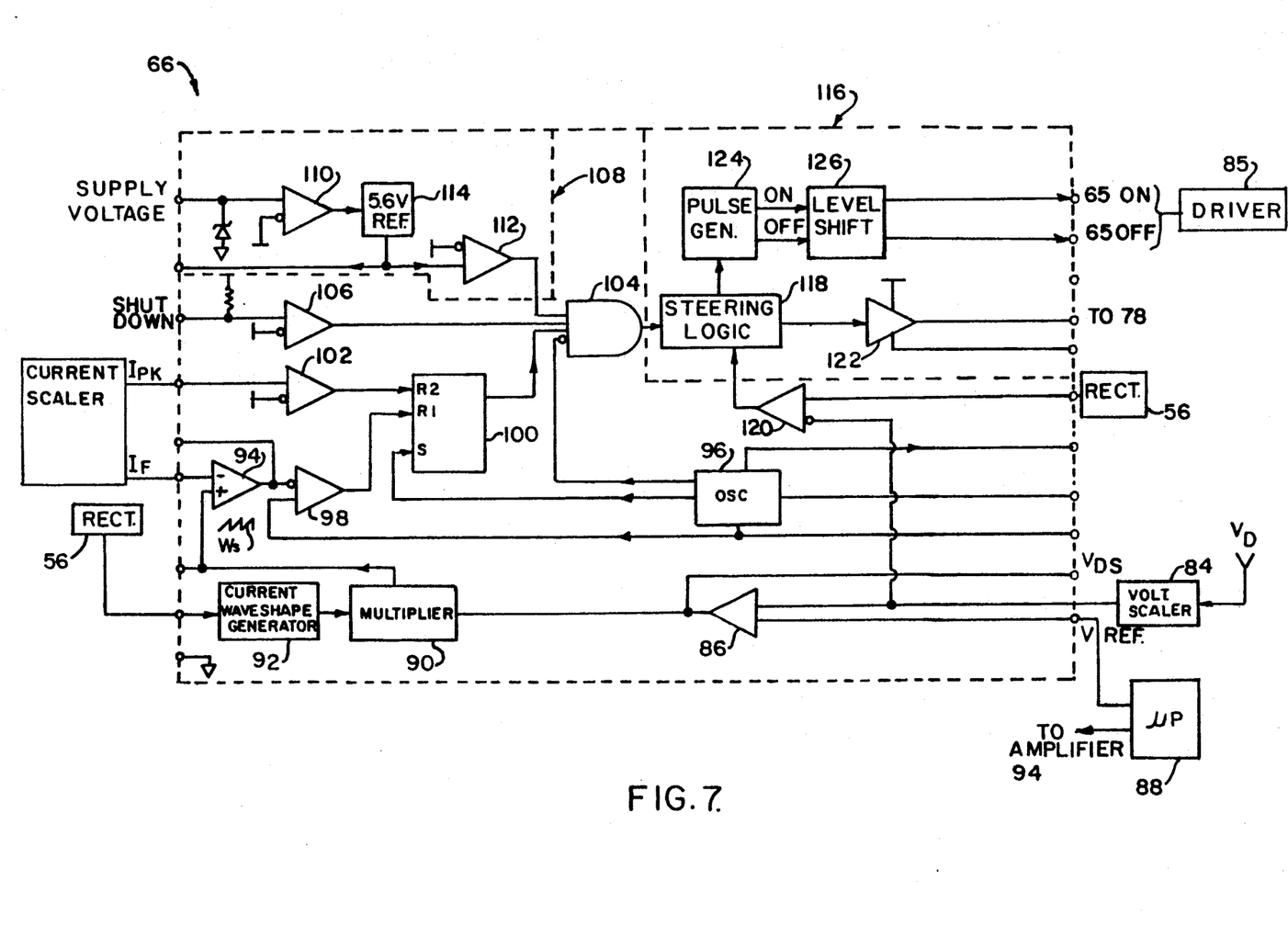

Referring to FIG. 7, to realize the time-sharing strategy of converter 50, control circuit 66 utilizes pulse-width modulation (PWM), which is well-known in the art, to control the instantaneous power conversion. The control circuit further utilizes a steering circuit, which is unique to control circuit 66, to direct PWM signals to transistor 64S when the input voltage amplitude is greater than the output voltage amplitude, and to transistor 78 when the input voltage amplitude is less than the output voltage amplitude. In addition, the steering circuit insures that transistor 78 is switched OFF for the entire duration that transistor 65 pulse width modulates, and that transistor 78 pulse width modulates. FIGS. 4e and 4f illustrate the respective behaviors of transistors 78 and 4f illustrate the respective behaviors of transistors 78 (Q1) and 65 (Q2) when controlled by the steering circuit.

With respect to FIG. 4d, which illustrates the time sharing between operational modes, it will be understood that the amount of time the converter is in one operational mode as compared to the other is not fixed; but rather, is time varying depending upon sensed changes between the characteristics of the actual converter output voltage and the preselected set of characteristics. Therefore, anything which may alter the voltage characteristics of the output voltage (a change in the load to which the voltage is applied, fluctuations in input line voltage characteristics, etc.), will immediately change the amount of time one converter section is performing the conversion, as compared to the other, all under the control of circuit 66.

In more detail, the output voltage $V_D$ of converter 50 is supplied to a voltage scaler 84, which could, for example, be a voltage divider network. The scaled output voltage $V_{DS}$ is applied to one input of a voltage amplifier 86 of the control circuit. A second input to the amplifier is a reference input $V_{ref}$ which is supplied by the system controller which can be, for example, a microprocessor 88. The microprocessor is programmed for the signal characteristics the converter output voltage should have based upon the characteristics of the input voltage waveform. Amplifier 86 compares the instantaneous output characteristics with those of its reference input, and provides as an output an error signal representing the differences between the two inputs.

This error signal is supplied to one input of a multiplier 90. A current waveshape generator 92 has as its input the rectified input voltage waveform from rectifier section 56 of the converter. Alternatively, the input to the generator could also be supplied by other means. The waveform output of generator 92 is also provided as an input to multiplier 90. The multiplier combines the error signal output from voltage amplifier 86 with that of the waveform generator, amplifies (multiplies) the result, and supplied this resultant waveform to one input of a sensed current amplifier 94. Amplifier 94 has as a second input one output from a current scaling module 95 which is a scaled and filtered version of the input current waveform to the converter. The amplifier compares the two waveforms and produces an error signal representing the differences between the two inputs.

As oscillator 96 is programmed to generate a waveform, for example, a sawtooth waveform Ws. It is common practice to operate the oscillator at a fixed, preselected frequency known as the PWM carrier frequency. This has the disadvantage of concentrating all the electro-magnetic interference (EMI) in a narrow frequency band. Tis, in turn, results in higher cost EMI filters. EMI noise can be more evenly spread throughout the frequency spectrum if the PWM carrier frequency is varied slowly in a continuous manner, for example, in accordance with the rectified output, resulting in a more economical realization of the EMI filter. One output from the oscillator is supplied as the non-inverting input of a comparator 98. The output from current amplifier 94 is supplied to the inverting input of the comparator. The output from comparator 98 is applied to one reset input of a latch 100. Oscillator 96 supplies its output to the set input S of the latch, in addition to supplying it to comparator 98. Latch 100 operates so there is a transition in its Q output from one logic state to another upon the occurrence of an element of waveform Ws at its set input S. By applying the error signal from comparator 98 to a reset input R1 of the latch, the Q output of the latch is reset to its initial logic state. Because the error signal changes, its application to latch 100 effectively varies the duty cycle of the output signal from the latch, generating the basic pulse-width modulated signal from the latch, generating the conversion process. A second comparator 102 has as one input the scaled, but instantaneous level of the input current to the converter, this input being supplied by the current module 95. Comparator 102 has as its other input a fixed value representing the maximum permissible peak value of the input current. The output of this comparator is applied to a second reset input R2 of latch 100 to reduce the duty cycle of the latch output if the peak input current exceeds the maximum permissible value and overrides the normal PWM signal to protect against excessive peak currents in the converter input circuit.

An AND gate 104 has multiple inputs. One input is the inverted waveform output from oscillator 96. A second input is the variable duty cycle output of latch 100. These two inputs to the gate combine to produce a PWM output signal from the gate. A third input is from a comparator 106 having as one input a system shutdown signal. A fourth input is from a power supply monitor circuit 108 converter. This circuit includes comparators 110 and 112, and a voltage reference 114. The circuit determines if the power supply level for the converter circuitry is within specified operating limits. It will be understood that the inputs to gate 104 from comparator 106 and power supply monitor circuit 108 are used to override the otherwise normal operation of the control circuit. Thus, if the load to which output voltage $V_D$ is supplied is shut down, there is no need for the control function provided by circuit 66. If, on the other hand, the converter power supply is outside the operational limits set for the converter, continued operation of the control circuit could result in damage to the converter or the load.

Referring to FIGS. 4b-4f, it will be seen whenever the output voltage $V_D$ is below the instantaneous rectified line voltage $V_R$, converter 50 used its "buck" mode of operation. For this mode, transistor 78 is switched "off" by control circuit 66 and transistor 65 is supplied a pulse width modulated output from the control circuit. When the output voltage is above the rectified line voltage, the converter is in its "boost" mode and transistor 78 is supplied the pulse width modulated output signal. However, transistor 645, instead of being switched "off", is maintained in its conducting state. This is because while transistor 78 is connected across the voltage lines in the converter, and therefore should be turned off when not pulse width modulated, transistor 65 is series connected in one of the voltage lines and must be maintained in conduction when not pulse width modulated. Since the converter is working with high voltage levels, it is desirable to operate transistors 65 and 78 in such a way that the stresses incurred in switching are minimized. This promotes a higher degree of conversion efficiency and a longer operational life for the transistor. The time sharing strategy employed in control circuit 66 helps achieve this operational advantage.

The pulse width modulated output from gate 104 is supplied to a steering circuit 116, and, more specifically, to a steering logic module 118. A comparator 120 has as one input the scaled and filtered output voltage from rectifier 56 of the converter, and as a second input the scaled output voltage from the converter. The comparator output is supplied as a second input to module 118. Module 118 comprises gating circuitry for steering the PWM output from gate 104. One output from module 118 is to a driver 122. The output of the driver is connected to the gate of transistor 78 and is used to switch the transistor "on" and "off". A second output from the module is to a pulse generator 124. Generator 124 is responsive to the PWM input supplied to it to generate two signals for each pulse input. One pulse is generated upon the occurrence of the leading edge of an input pulse, and the second pulse is generated upon occurrence of the trailing edge thereof. Generator 124 acts as a power conservatory in that the pulses it generates are much shorter in duration than the width of an input pulse to the generator. Thus, the amount of energy contained in the outputs from generator 124 is much less than if the PWM input were supplied directly to transistor 65.

The two pulses produced by generator 124 for each PWM input, are provided to a level shifting circuit 126. As previously noted, transistor 65 requires a high voltage input. The circuitry employed within control circuit 66 operates at a low voltage level, approximately 5v d.c. Circuit 126 converts the low level input from generator 124 to the high level input required for operating transistor 65. The "on" and "off" outputs from circuit 126 are supplied to transistor 65 by a driver circuit 127 that operates at the same high voltage as the high line.

Figure 5:
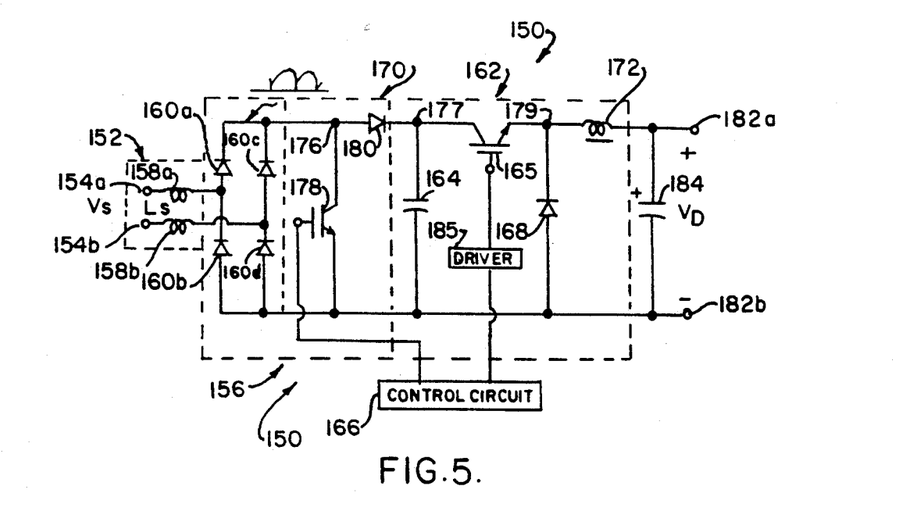
FIG. 5 is a schematic of a second embodiment of the converter circuit of the invention.

Referring to FIG. 5, an alternate embodiment of the converter of the present invention is indicated generally 150. The front end of this converter is similar to that of converter 50 in that it has an input section 152 and a full-wave rectifier section 156. Therafter, the converter includes a first conversion means 170 which is a "boost"-type converter. This conversion means includes a transistor 178 whose drain-source circuit is connected across the output of rectifier section 156, the drain being connected to a node 176 at one side of the rectifier output. The gate of the transistor is connected to a control circuit 166 which functions in the same manner as the circuit 66 previously described. A diode 180 is connected between node 176 and a node 177.

Converter 150 also includes a second conversion me 162 which is a "buck"-type converter. A filter capacitor 164 is connected between node 177 and the source of transistor 178. A transistor 165 has its drain-source circuit connected between node 177 and a node 179, this circuit being in-line with the high side of the voltage path through the converter. The gate of the transistor is connected to a driver circuit 185 which, in turn, is connected to a control circuit 166. A diode 168 is connected in parallel between the source of transistor 165 and capacitor 164. An inductor 172 is series connected between node 179 and output terminal 182a of the converter; while, the cathode of diode 168 is also connected to output terminal 182b of the converter. An energy storage output capacitor 184 is connected across these output terminals and the converter output voltage $V_D$ is developed across this capacitor.

Operation of converter 150 is generally the same as that of converter 50, the major difference between the two embodiments being the reversal of the "buck" and "boost" converter sections.

Figure 6:
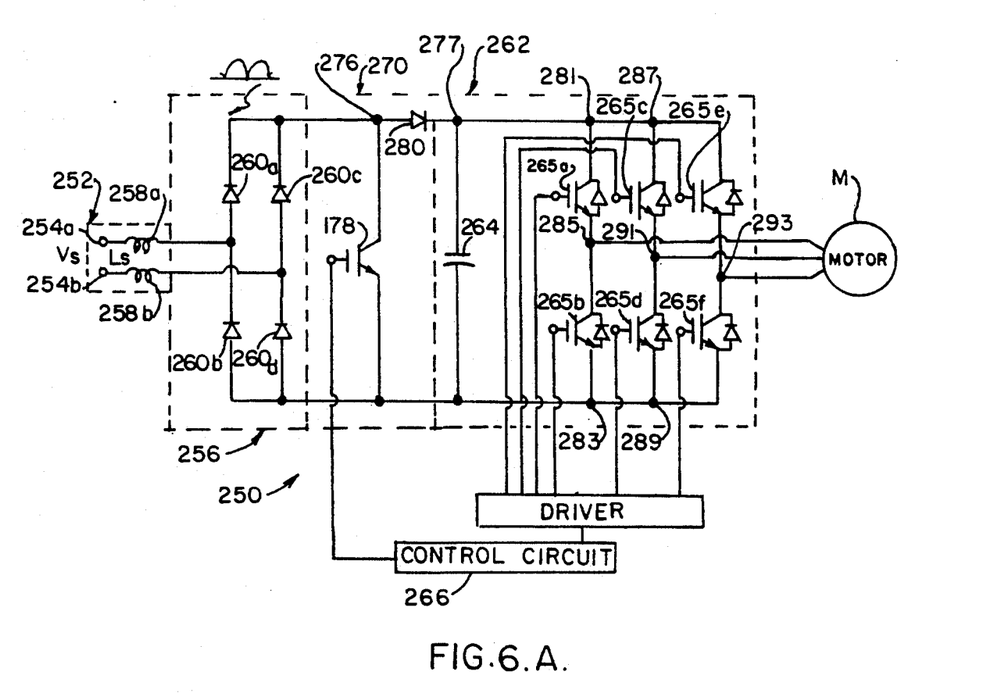
FIG. 6A is a schematic of a third embodiment of the converter circuit for use as a motor drive for a polyphase motor.
FIG. 6B is a partial schematic for an alternate embodiment of converter of FIG. 6A; and, FIG. 7 is a block diagram of a control circuit in accordance with the present invention.

Referring to FIG. 6A, a third embodiment of the converter of the present invention is indicated generally 250. Converter 250 differs from the previously described embodiments in that the output from the converter is for use with a poly-phase a.c. load such as the three-phase motor M. The converter is similar to converter 150 with regard to its input section 252, rectifier section, and first converter section 270. After converter section 270, converter 250 has a three-phase "buck" section 262. The section includes six transistors 265a-265f arranged in three pairs, one pair for each phase. Because the arrangement for the three phases is identical, only one is described. Thus, the drain of transistor 265a is connected to a node 281 on the high side voltage line of the converter. The source of its paired transistor 265b is connected to a node 283 on the low side voltage line. The source of transistor 265a is connected to a node 285 to which one input to motor M is connected. The drain of transistor 265b is also connected to this node. The gates of the transistors are connected to a driver circuit 227 and thus to a control circuit 266 which, again, functions in the manner described with respect to control circuit 66. Beside the pulse-width modulation control feature described with respect to circuit 66, control circuit 266 and converter section 262 act to convert the d.c. output voltage from the converter to provide an a.c. output to each motor phase.

Figure 6B:
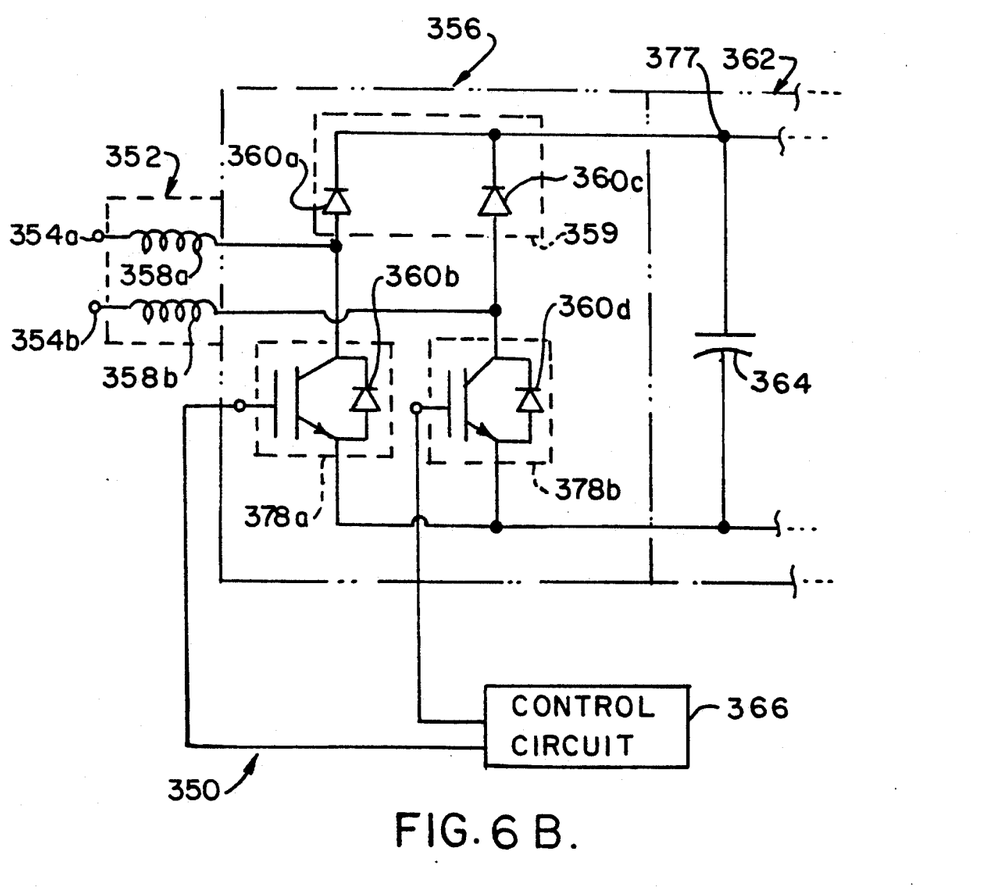

FIG. 6B discloses a converter 350 which is similar to the converter 250 of FIG. 6A, except for the front end portion of the converter. For this reason, only this portion of the converter is shown. The main feature of converter 350 is that it combines both the rectifier section and first conversion means, "boost section", of the converter into one section, thereby reducing the number of parts required for the converter. Again, input section 352 is similar to that previously described, as is the second converter "buck" section 362. NOW, however, converter section 356 comprises a dual fast diode module 359 comprising diodes 360a, and 360c. Diodes packaged such as diodes 360a, 360c in a module 359 are currently, commercially available. The diodes comprise two legs of a full-wave rectifier as previously described.

The other two legs of the rectifier include MOSFET transistors 378a, 378b. Respective diodes 360b, and 360d are connected across the drain-source paths of the two transistors to complete the other two legs of the rectifier. The gate of each transistor is connected to a control circuit 366, and operation of the transistors is as previously described with respect to transistor 78 to perform the "boost" conversion function of the converter. MOSFETs packaged with diodes such as 360b, and 360d are also currently, commercially available. Thus, the number of parts required to achieve both the rectification and "boost" functions of a converter 350 has been reduced to three. The output from section 356 is applied across a capacitor 364 within section 362.

It will be understood that the above simplification is obtainable because transistors 378a, 378b are not subjected high voltage, just as transistor 78 of converter 50 is not. As a result, the circuit of FIG. 6B could also be used in the converter 150 shown in FIG. 5.

In view of the foregoing, it will be seen that the several objects of the invention are achieved and other advantageous results are obtained. In particular, it will be noted that the pulse-width modulation and unique time sharing arrangement described has several advantages over an arrangement in which a conventional boost converter and a conventional buck converter are sequentially arranged. Since a combination of these conventional converter elements would require intermediate energy storage capability and dual processing of power, the converter of the present invention provides not only a lower cost system but also one which is more efficient.

Further, as noted with respect to the "boost" circuit of FIG. 3a, one drawback with circuits of this type are the effects of an initial current surge through the converter. In the converter of the present invention, operation of transistor 65 by control circuit 66 can limit the effects of an initial current surge and improve the operating life of the converter.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A high power factor converter for use with motor drives and power supplies to convert an a.c. input voltage to a d.c. output voltage comprising:

first conversion means for providing a d.c. output voltage having pre-selected voltage characteristics and for performing a voltage conversion during a portion of the input voltage cycle in which the input voltage level exceeds that of the output voltage level, said first conversion means being a "buck" type voltage converter and including first semiconductor means;

second conversion means connected to said first conversion means for providing said output voltage and for performing a voltage conversion during a portion of the input voltage cycle in which the output voltage level exceeds that of the input voltage level, said second conversion means being a "boost" type voltage converter and including second semiconductor means;

rectification means connected between the input voltage source and said first conversion means; and, control means responsive to the relative levels of the input and output voltages to control operation of said first and second semiconductor means and thereby operate the first and second conversion means on a time sharing basis, said control means including steering logic means responsive to the instantaneous relative voltage levels of the input and output voltages to switch said second semiconductor means into and out of conduction, and for controlling operation said first semiconductor means on a pulse width modulated basis, and said control means further including means sensing for the actual voltage characteristics of the output voltage, means for storing a pre-selected set of output voltage characteristics, and means for comparing the sensed actual voltage characteristics with the pre-selected set thereof.

2. The converter of claim 1 wherein the steering logic further includes pulse generator means and level shifting means to which the output of the pulse generator means is supplied, the pulse generator means supplying a relatively low voltage output to the level shifting means, and the level shifting means, in turn, supplying a high voltage level to the first semiconductor means to switch it into and out of conduction.

3. The converter of claim 2 wherein the pulse generator means supplies separate voltage signals to the level shifting means for controlling operation of the first semiconductor means, the pulse width of the signals supplied to the level shifting means being shorter in duration than that of input signals to the pulse generator means thereby to converse operation power.

4. The converter of claim 3 further including means for sensing a peak level of converter input current and for inhibiting operation of the steering logic if the sensed level exceeds a pre-selected maximum current level.

5. The converter of claim 3 further including means for sensing the shut down of a load to which the converter is connected for inhibiting operation of the steering logic.

6. The converter of claim 3 further including means for monitoring a converter power supply and for inhibiting operation of the steering logic if the power supply levels fall outside predetermined operating characteristic levels.

7. The converter of claim 3 further including driver means for switching the first semiconductor means into and out of conduction, the driver means having as inputs switching signals produced by the level shifting means.

* * * * *

UNITED STATES PATENT AND TRADEMARK OFFICE
CERTIFICATE OF CORRECTION

PATENT NO. : 5,235,504

DATED : Aug. 10, 1993

INVENTOR(S) : Pradeep K. Sood

It is certified that error appears in the above-indentified patent and that said Letters Patent is hereby corrected as shown below:

Column 2, line 66, after "circuit" insert therefor ---of---;
Column 3, line 16, after "FIG." insert therefor ---1---;
Column 3, line 28, delete "P" and insert therefor ---$P_T$;
Column 3, line 30, delete "FP=$T_T$" and insert therefor ---PF=$P_T$;
Column 5, line 41, delete "bottom" and insert therefor ---both---;
Column 5, line 62, delete "645" and insert therefor ---65---;
Column 5, line 68, after "transistor" insert ---65 is switched ON for the entire duration transistor---"
Column 6, line 2 after "78" delete ---and 4f illustrates the respective behaviors of transistors 78---;
Column 6, line 50, delete "As" and insert therefor ---An---;
Column 6, line 56, delete "Tis" and insert therefor ---This---;
Column 7, line 9, delete "from the latch, generating the" and insert therefor ---used to control the power---;
Column 7, line 44, delete "used" and insert therefor ---uses---;
Column 7, line 51, delete "645" and insert therefor ---65---;

UNITED STATES PATENT AND TRADEMARK OFFICE
CERTIFICATE OF CORRECTION

PATENT NO. : 5,235,504
DATED : Aug. 10, 1993
INVENTOR(S) : Pradeep K. Sood

It is certified that error appears in the above-indentified patent and that said Letters Patent is hereby corrected as shown below:

Column 9, line 38, delete "NOW" and insert therefor
---Now---

Signed and Sealed this

Twenty-third Day of August, 1994

Attest:

BRUCE LEHMAN

*Attesting Officer*     *Commissioner of Patents and Trademarks*